L. K. SMITH.
HUB LINER FOR LOCOMOTIVE JOURNALS.
APPLICATION FILED APR. 23, 1912.
1,074,752.
Patented Oct. 7, 1913.
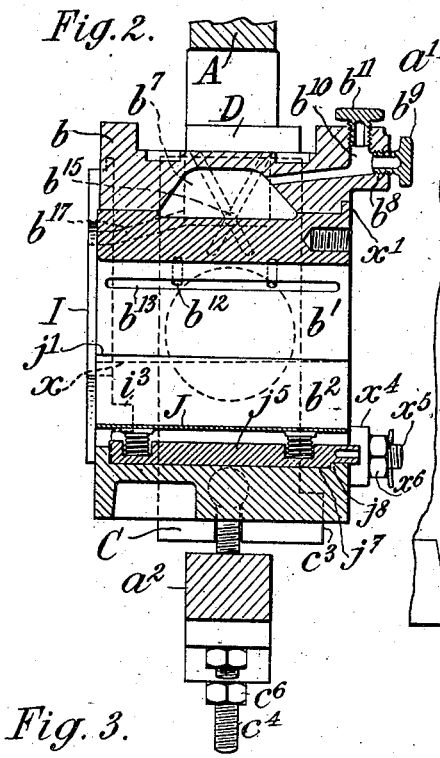
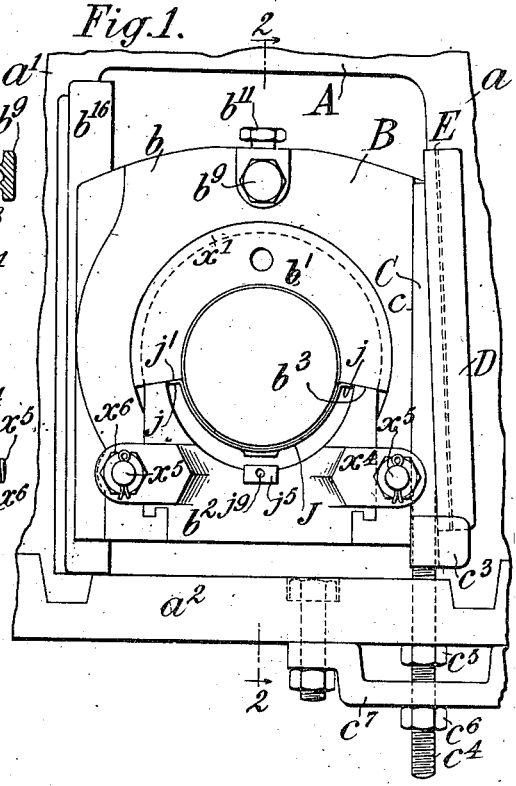
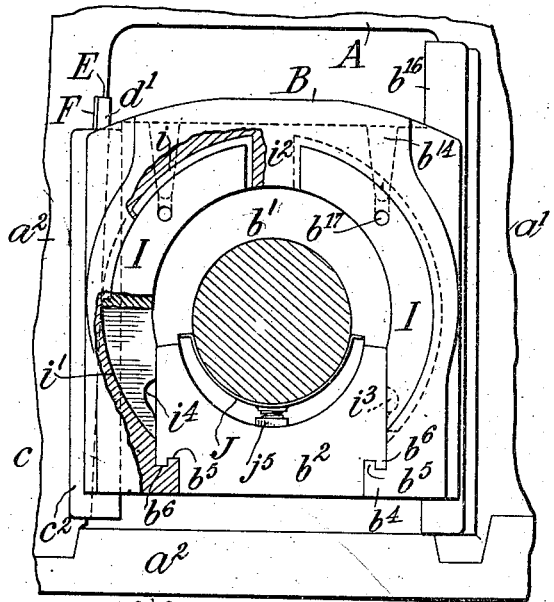
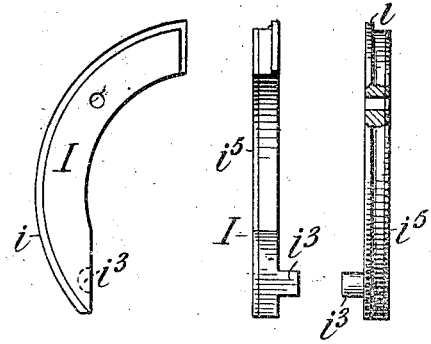
INVENTOR:
Luther K. Smith,
By Attorneys,
Fraser, Trask & Myers
WITNESSES:
René Buine
Fred White

UNITED STATES PATENT OFFICE.

LUTHER KELLER SMITH, OF MOBERLY, MISSOURI, ASSIGNOR TO AUGUSTUS CRANE BUZBY, OF PHILADELPHIA, PENNSYLVANIA.

HUB-LINER FOR LOCOMOTIVE-JOURNALS.

1,074,752.  Specification of Letters Patent.  Patented Oct. 7, 1913.

Original application filed February 2, 1912, Serial No. 674,861. Divided and this application filed April 23, 1912. Serial No. 692,671.

*To all whom it may concern:*

Be it known that I, LUTHER K. SMITH, a citizen of the United States, residing in Moberly, in the county of Randolph and State of Missouri, have invented certain new and useful Improvements in Hub-Liners for Locomotive-Journals, of which the following is a specification.

My invention relates to journal boxes especially adapted to the journals of locomotive driving wheels and other similar heavy journals and has for its object to produce a new and improved hub liner for use in such structures. The said devices are illustrated in this application in connection with a journal bearing of the character of that illustrated in Patent No. 941,661, issued to me November 30th, 1909, but they are not confined in use to a journal bearing of this description.

My present invention is a division of a former application filed by me February 2nd, 1912, Serial No. 674,861.

The object of my invention is to provide a structure which shall be simple in construction and shall be economical, durable and efficient in use and a most important object to be accomplished is that the parts mentioned which require adjustment and replacement in use may be so replaced without dismantling a locomotive engine, if they are applied thereto, or sending the same to the repair-shop whereby the usefulness of the engine is greatly increased.

In achieving the foregoing objects my invention consists in the production of a hub liner which is adapted to be inserted between the bearing and the hub of a wheel and which may be inserted in place or removed therefrom without dismantling the engine or taking the journal box off the journal or away from under the engine.

In the accompanying drawing illustrating a desirable form in which my invention may be embodied, Figure 1 is a face view of a journal bearing to which my invention is applied. Fig. 2 is a vertical section thereof on the line 2—2, Fig. 1, looking toward the right. Fig. 3 is a rear elevation of a journal bearing partly broken. Figs. 4, 5 and 6 are detail views of the hub liner forming part of my present invention.

I have for convenience of understanding illustrated my invention as applied to a journal bearing of the construction shown in my Patent No. 941,661, although the invention is not necessarily limited in its application to this type of journal bearing. The general features of construction of the journal bearing referred to are fully described in said patent and application, Serial No. 674,861, and for the sake of brevity are omitted here.

The construction of grease holder and dust guard illustrated in the drawings is not claimed in this application, but is claimed in a separate application filed by me April 23, 1912, Serial No. 692,672.

I have also illustrated a wedge C which is employed for the purpose of taking up the wear between the journal box and the pedestal jaws and preventing lateral movement of the journal box. The construction of wedge and its associated parts is not herein claimed, but is claimed in my said application, Serial No. 674,861, filed February 2, 1912.

The foregoing parts form no part of the invention in this present application.

I will now proceed to describe the particular points to which the claims are directed.

In Figs. 4, 5 and 6 I have illustrated the improved hub liner designed by me removed from the journal box. This hub liner is in two parts which are the same in construction with the exception that they are made right and left. One of such hub liners is illustrated in detail in said figures, and is there lettered I. Said hub liners are made substantially in the arc of a circle, and are provided with peripheral flanges $i$ which are received in corresponding grooves $i'$ in the body B. These grooves extend to the lower inner face of the body where they open for the reception of the hub liners. At the upper portion the end of the said grooves is closed by the body at $i^2$ forming an abutment which limits the upward movement of the hub liners. Each hub liner is provided with an inwardly projecting stud $i^3$ which is received in a corresponding recess $i^4$ of the body (see Fig. 3). The cellar block $b^2$ when moved to its extreme forward adjustment passes beyond the said studs $i^3$ and holds the hub liners in place (Fig. 2). The brass $b'$ likewise overlaps the inner edge of the hub liners when in position in the journal box and assists in holding them in place, and forms a support therefor. The wearing face $i^5$ of the hub liner is formed of a plate of suitable bearing metal, such as tin, properly fixed thereto and this may be renewed when desired. Said hub liner possesses particular advantages in that the hub liner can be removed for the purpose of repairing or refacing the bearing face without taking the journal box off from the journal or out from under the engine. To remove the hub liner it is only necessary to pull the cellar block $b^2$ and the journal brass $b'$ out of the box far enough to clear the inside face of the liner and the studs $i^3$, whereupon the said hub liners may easily be removed by simply sliding them out of the grooves $i'$. The cellar may be moved by taking off nuts $x^6$ on bolts $x^5$ whereby lugs $x^4$ are freed. The removing of the cellar permits the brass to be also moved. It is not necessary to dismantle any part of the engine in order to accomplish this purpose. The grooves $i'$ for the reception of the hub liners are situated near the face of the body B and when the cellar block $b^2$ and the brass $b'$ are slightly withdrawn the hub liners I are easily inserted in place by taking them one at a time and introducing the upper edge of the flange $i$ in the lower end of the groove $i'$. The lug $i^3$ will then pass within the recess $i^4$ and this hub liner may be held in place while the opposite hub liner is similarly inserted in its groove and recess. The brass and cellar block being then again adjusted to their position the hub liners will be firmly held in place.

Means are provided for lubricating the hub-liners comprising ports $b^{17}$ by which lubricant is conducted from the reservoir $b^{14}$ to the said hub liners.

While I have described with great particularity the detail features of construction of the said invention, it will be apparent that the invention is not in all things limited to such particular details or structural formation, and that equivalent devices may be employed and changes made therein within the limits of the appended claims.

What I claim is:—

1. The combination of a journal box body having channels in its rear face, hub liners in the said channels, and a bearing brass disposed in the body with its rear end when in operative position engaging the hub liners and preventing their withdrawal, said brass adapted to be moved out of engagement with said hub liner by a slight axial movement, and without removing it entirely from the box, whereupon said hub liners are adapted to be moved out of their channels.

2. The combination of a journal box body having channels in its rear face provided with undercut walls, hub liners seated in the channels and having flanges engaging the undercut walls thereof, and a bearing brass arranged in the body with its rear end when in operative position engaging the hub liners and preventing their withdrawal.

3. The combination of a journal box body having a chamber, a bearing brass therein, a cellar disposed in the body under the bearing brass, and hub liners applied to the rear face of the body, said bearing brass and cellar engaging said hub liners and preventing their withdrawal, and said hub liners being adapted to be withdrawn upon movement of said brass and cellar out of engaging position.

4. The combination of a journal box body having channels in its rear face provided with undercut walls and having inwardly-extending recesses leading from the channels, hub liners seated in the channels and engaging the undercut walls thereof and provided with lugs extending into the recess, a cellar in the body engaging the said lugs and preventing their movement out of said recess while the cellar is in operative position, and a bearing brass in the body engaging the hub liners and preventing their withdrawal while the brass is in operative position.

5. The combination of a journal box body having arculate channels in its rear face substantially concentric with the journal opening and provided with undercut walls, hub liners formed in substantially the arc of a circle having peripheral flanges adapted to be inserted in said channels, and a sliding member in said journal box adapted to overlap a portion of said liners and to hold the same in place and prevent the withdrawal of said liners while said sliding member is in operative position and to permit such withdrawal upon movement of said sliding member out of such overlapping position.

6. The combination of a journal box body having arcuate channels in its rear face substantially concentric with the journal opening and provided with undercut walls and having inwardly extending recesses communicating with said channels, hub liners formed in substantially the arc of a circle, having peripheral flanges adapted to be inserted in said channels and provided with lugs extending into the recesses, and a cellar in the body engaging the lugs and adapted to prevent the hub liners moving out of place, and a sliding member in said journal box adapted to overlap a portion of said liners and to prevent the movement of said liners out of place.

7. The combination of a journal box body having arcuate liner receiving channels in its rear face, said channels arranged substantially concentric with the journal opening, hub liners in said channels, and a bearing brass disposed in the body with its rear end overlapping the said liners and preventing the movement of said liners while the bearing brass is in said overlapping position.

8. The combination with a journal box body having a brass slidably mounted therein and said body having a pair of arcuate liner-receiving channels in its rear face, said channels opening inwardly and being closed at their outer ends, of a pair of arcuate hub liners, each having a flange and being adapted to slide in one of said channels, and said brass adapted when in operative position to overlap said hub liners and prevent their movement.

9. The combination with a journal box body having a brass and a cellar, each slidably mounted therein, and said body having a pair of arcuate liner-receiving channels in its rear face, said channels opening inwardly and being closed at their outer ends, of a pair of arcuate hub liners each having a flange and being adapted to slide in one of said channels, and each of said hub liners having a lug at its outer end arranged perpendicularly thereto and adapted to enter a recess in the body when said hub liner is in operative position, and said brass adapted when in operative position to overlap said hub liners and prevent their movement, and said cellar adapted when in operative position to overlap said lugs and prevent movement of said hub liners, both said hub liners adapted to be slid out of their respective channels upon movement of said brass and cellar out of overlapping position, without removing the journal from the journal box.

In witness whereof, I have hereunto signed my name in the presence of two subscribing witnesses.

LUTHER KELLER SMITH.

Witnesses:
 W. E. LUTES,
 R. B. BROWNING.